(12) United States Patent
Tinio et al.

(10) Patent No.: US 11,444,473 B2
(45) Date of Patent: Sep. 13, 2022

(54) DYNAMIC BATTERY CHARGING FOR MAXIMUM WIND/SOLAR PEAK CLIPPING RECAPTURE

(71) Applicant: Inventus Holdings, LLC, Juno Beach, FL (US)

(72) Inventors: Marc Benedict C. Tinio, Juno Beach, FL (US); Colm B. O'Reilly, Juno Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 217 days.

(21) Appl. No.: 16/653,518

(22) Filed: Oct. 15, 2019

(65) Prior Publication Data

US 2021/0111576 A1 Apr. 15, 2021

(51) Int. Cl.
*H02J 7/00* (2006.01)
*H02J 3/38* (2006.01)
*G05B 13/02* (2006.01)

(52) U.S. Cl.
CPC .......... *H02J 7/0068* (2013.01); *G05B 13/026* (2013.01); *H02J 3/383* (2013.01); *H02J 3/386* (2013.01)

(58) Field of Classification Search
CPC .......... H02J 7/0068; H02J 3/383; H02J 3/386; G05B 13/026
See application file for complete search history.

(56) References Cited

U.S. PATENT DOCUMENTS

| 8,013,583 B2 | 9/2011 | Matan |
| 8,222,765 B2 | 7/2012 | Collins et al. |

(Continued)

FOREIGN PATENT DOCUMENTS

| CN | 206595757 | 10/2017 |
| WO | 2011058806 | 5/2011 |

(Continued)

OTHER PUBLICATIONS

Teleke, S., Baran, M.E., Bhattacharya, S., & Huang, A.Q. (2010). Rule-Based Control of Battery Energy Storage for Dispatching Intermittent Renewable Sources. IEEE Transactions on Sustainable Energy, 1, 117-124.

(Continued)

*Primary Examiner* — Thomas C Lee
*Assistant Examiner* — Charles Cai
(74) *Attorney, Agent, or Firm* — Fleit Intellectual Property Law; Donna Flores

(57) ABSTRACT

Various embodiments charges battery for a renewable energy source. In one embodiment, a forecast having a plurality of predetermined time intervals with a predicted energy input level of the renewable energy source corresponding to each predetermined time interval is received. A setpoint is calculated for each predetermined time interval for an amount of power available to charge the battery based on the forecast. The battery is charged during a predetermined time interval according to its corresponding setpoint. An actual energy input level of the renewable energy source is monitored and compared to the predicted energy input level for its corresponding time interval to determine a lesser energy input level. The lesser energy input level is set as the setpoint for the corresponding predetermined time interval.

20 Claims, 7 Drawing Sheets

(56) References Cited

U.S. PATENT DOCUMENTS

| | | | |
|---|---|---|---|
| 8,638,061 B2* | 1/2014 | Moore | H02J 3/14 |
| | | | 320/103 |
| 8,773,066 B2 | 7/2014 | Kelty | |
| 8,798,830 B2 | 8/2014 | Sobue et al. | |
| 9,212,830 B2 | 12/2015 | Guillemette | |
| 9,401,610 B2 | 7/2016 | Uyeki | |
| 9,780,602 B2 | 10/2017 | Tuerk et al. | |
| 10,023,061 B2 | 7/2018 | Dudar et al. | |
| 10,110,056 B2 | 10/2018 | Dyer et al. | |
| 10,123,390 B2 | 11/2018 | Tousain et al. | |
| 2003/0047209 A1* | 3/2003 | Yanai | H02J 3/32 |
| | | | 136/244 |
| 2013/0205778 A1 | 8/2013 | Hansen | |
| 2013/0297126 A1* | 11/2013 | Yamazaki | B60W 10/02 |
| | | | 701/22 |
| 2014/0337002 A1 | 11/2014 | Manto | |
| 2015/0188482 A1 | 7/2015 | Berkowitz et al. | |
| 2015/0236531 A1 | 8/2015 | Guillou et al. | |
| 2017/0005470 A1* | 1/2017 | Wagoner | G06Q 50/06 |
| 2017/0070084 A1 | 3/2017 | Matsumoto et al. | |
| 2017/0104336 A1* | 4/2017 | ElBsat | H02J 3/383 |
| 2017/0104337 A1* | 4/2017 | Drees | H02J 3/40 |
| 2017/0331322 A1 | 11/2017 | Tuerk et al. | |
| 2018/0013289 A1* | 1/2018 | Uenishi | G05B 19/042 |

FOREIGN PATENT DOCUMENTS

| | | |
|---|---|---|
| WO | 2011152448 | 12/2011 |
| WO | 2012124158 | 9/2012 |
| WO | 2014170800 | 10/2014 |
| WO | 2017104161 | 6/2017 |
| WO | 2017138629 | 8/2017 |
| WO | 2018047415 | 3/2018 |
| WO | 2018098575 | 6/2018 |

OTHER PUBLICATIONS

Chen, Chong & Duan, Shuge & Cai, Tao & Liu, Bangyin & Hu, G.. (2011). Smart energy management system for optimal microgrid economic operation. Renewable Power Generation, IET. 5. 258-267. 10.1049/iet-rpg.2010.0052.

W. Su, J. Wang and J. Roh, "Stochastic Energy Scheduling in Microgrids With Intermittent Renewable Energy Resources," in IEEE Transactions on Smart Grid, vol. 5, No. 4, pp. 1876-1883, Jul. 2014.

Sharma et al., Predicting solar generation from weather forecasts using machine learning, 2011 IEEE International Conference on Smart Grid Communications (SmartGridComm), Oct. 17-20, 2011.

Lorenz, E., Hurka, J., Heinemann, D., & Beyer, H. (2009). Irradiance Forecasting for the Power Prediction of Grid-Connected Photovoltaic Systems. IEEE Journal of Selected Topics in Applied Earth Observations and Remote Sensing, 2, 2-10.

* cited by examiner

DYNAMIC BATTERY CHARGING FOR MAXIMUM WIND/SOLAR PEAK CLIPPING RECAPTURE

BACKGROUND

Field of the Invention

The present disclosure generally relates to rechargeable batteries, and more particularly relates to dynamically charging a rechargeable battery in a renewable energy system to make maximum recapture from energy clipping.

Description of the Related Art

In a renewable energy site, such as a solar or wind-powered site, which has a backup or reserve battery, charging the battery should be performed as cost-effectively as possible. Typically, a site is "overbuilt" (i.e. the renewable energy site has more capability than needed) to account for system losses and to maintain the optimum point of interest (POI) (aka "the grid") MW output. The battery is added to take advantage of this excess energy production capability and to be able to help stabilize the grid MW output when the solar or wind conditions are not at full capability (e.g., sun is down or overcast, lower intensity sun, wind is not blowing, etc.)

However, electric production is often lost as the overbuilt capacity (i.e. "extra" power) cannot be sold back to the electrical provider and is essentially wasted as the energy available to recharge the battery is often clipped or limited.

BRIEF SUMMARY

In one embodiment, a method of charging a battery for a renewable energy source is disclosed. The method comprises receiving a forecast having a plurality of predetermined time intervals with a predicted energy input level of the renewable energy source corresponding to each predetermined time interval; calculating a setpoint for each predetermined time interval for an amount of power available to charge the battery for each predetermined time interval based on the forecast; charging the battery during a predetermined time interval according to its corresponding setpoint; monitoring an actual energy input level of the renewable energy source; comparing the actual energy input level to the predicted energy input level for its corresponding time interval to determine a lesser energy input level; and setting the lesser energy input level as the setpoint for the corresponding predetermined time interval.

In another embodiment, a renewable energy producing system is disclosed. The renewable energy producing system comprises a rechargeable battery, a load, a transformer that exchanges energy between the rechargeable battery and the load, a controller and a battery management system. The controller receives a forecast having a plurality of predetermined time intervals with a predicted energy input level of the renewable energy source corresponding to each predetermined time interval, calculates a setpoint for each predetermined time interval for an amount of power available to charge the battery for each predetermined time interval based on the forecast, and charges the battery during a predetermined time interval according to its corresponding setpoint. The battery management system monitors an actual energy input level of the renewable energy source, compares the actual energy input level to the predicted energy input level for its corresponding time interval to determine a lesser energy input level, and sets the lesser energy input level as the setpoint for the corresponding predetermined time interval.

In yet another embodiment, a computer program product for charging a battery for a renewable energy source is disclosed. The computer program product comprises a non-transitory storage medium readable by a processing circuit and storing instructions for execution by the processing circuit for performing a method. The method comprises receiving a forecast having a plurality of predetermined time intervals with a predicted energy input level of the renewable energy source corresponding to each predetermined time interval, calculating a setpoint for each predetermined time interval for an amount of power available to charge the battery for each predetermined time interval based on the forecast, charging the battery dud ng a predetermined time interval according to its corresponding setpoint, monitoring an actual energy input level of the renewable energy source, comparing the actual energy input level to the predicted energy input level for its corresponding time interval to determine a lesser energy input level, and setting the lesser energy input level as the setpoint for the corresponding predetermined time interval.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
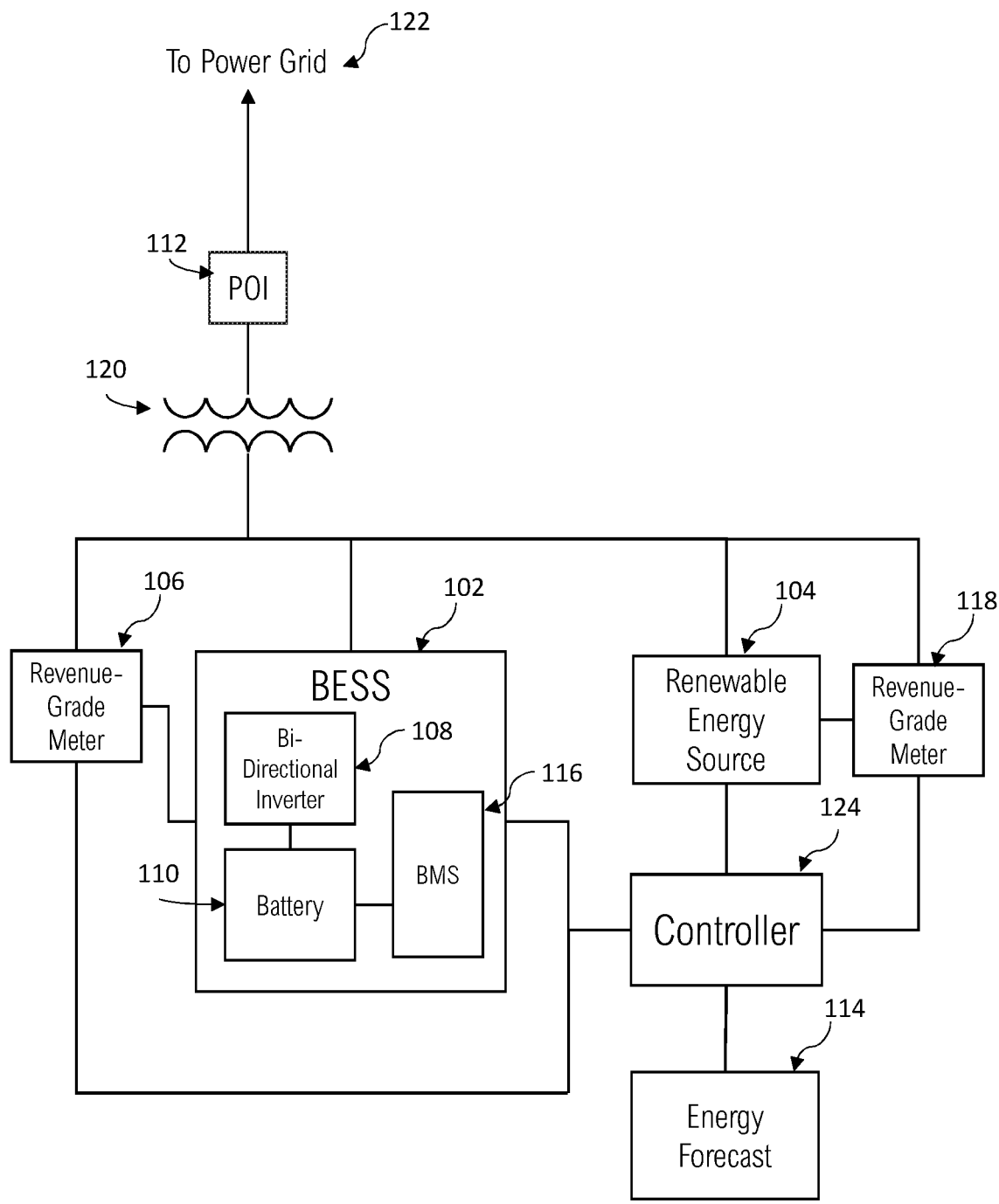
FIG. 1 is a block diagram illustrating one example of an operating environment comprising a renewable energy producing system with a rechargeable backup battery according to one embodiment of the present disclosure.

FIG. 1 depicts a renewable energy producing system 100 with a battery energy storage system (BESS) 102. The BESS 102, in its simplest form, includes a DC battery bank (referenced herein as "battery 110") wired to a bi-directional inverter 108 with AC-to-DC capabilities for charging and DC-to-AC for discharging. The BESS 102 can be a single inverter+battery unit "LineUp" 110 or can have multiple LineUps (not shown) depending on the battery power and/or capacity needs. The BESS 102 also includes a Battery Management System (BMS) 116.

The renewable energy producing system 100 allows a renewable energy source 104, such as solar photovoltaic cell panels or wind turbines, to be incorporated into an electrical power system which discharges energy to an electrical power distribution grid 122 (also referenced herein as "power grid 122"). The BESS 102 and renewable energy source 104 in this example are connected to a transformer 120 that exchanges energy between the battery 110 and/or the renewable energy source 104 and a power grid 12. The battery 110 is able to periodically provide electric power through the transformer 120 to the grid 122, or to a particular load or premises on the grid 122 in further examples, based upon a number of factors including demand and load management factors. The transformer 120 contains (or is connected to) a breaker (not shown) which allows the BESS 102 and/or the renewable energy source 104 to easily be disconnected from the power grid 122 for emergency or maintenance purposes.

A controller 124 generally controls the direction and amount of energy being exchanged through the transformer 120 and is therefore able to control the charging and discharging cycles of the BESS 102. It should be noted that the BESS 102 may be used to provide power to other loads in addition to or in place of the electrical power grid 122. Although shown in FIG. 1 as a single controller 124, various embodiments r ray include a separate controller for operation of each of the BESS 102 and the renewable energy source 104, in which case the multiple controllers would interface with each other for integrated control of the renewable energy producing system 100.

The BMS 116 operates to monitor the operation of the battery 110 and determine an estimate of the amount of charge in the battery 110, which corresponds to the energy remaining in the battery, at a given time. The BMS 116 provides the present state-of-charge of the battery 110 to the controller 124. The controller 124 is able to incorporate the present state-of-charge of the battery 110 in determining how much electrical current should be provided (charge) to or taken (discharge) from the battery 110 through transformer 120.

The battery 110 in this example is connected to a first revenue-grade meter 106. Revenue-grade meter 106 measures voltage, current, frequency and other parameters of battery 110 and calculates real and reactive power, etc. A second revenue-grade meter 118 measures these parameters with respect to the renewable energy source 104. Both revenue-grade meters 106, 118 provide their respective data to the controller 124.

The BMS 116, in one example, is a dedicated processor or a computing process within a general purpose processor that receives, assembles and processes battery status data to determine or estimate the present state-of-charge of the battery 110. In an example, the BMS 116 estimates the state-of-charge present in the battery 110 based on the battery output voltage measurements and the electrical current measurements received from revenue-grade meter 106. In an example, electrical current drawn from or provided to the battery 110 is integrated and this integrated value is used as a basis for determining the state-of-charge of the battery 110.

In an example, the controller 124 is also able to determine the charging state of the battery 110. The charging state of the battery 110, in an example, is able to be one of that the battery 110 is in a state of being charged, being discharged, or the battery 110 is idle without appreciable current flowing therethrough. In an example, the charging state of the battery 110 is able to be determined by the present direction of current flow through the battery 110, where current into the battery 110 indicates that the battery 110 is being charged, current being drawn from the battery 110 indicates that the battery 110 is being discharged, and substantially no current through the battery 110 indicates that the battery 110 is idle.

The maximum amount of energy that a battery 110 can store when the battery is fully charged is referred to as the battery's present capacity. The total amount of battery capacity of the batteries 110 in the BESS 102 degrades with usage and time.

The controller 124 monitors, accumulates and processes measured values and determines values and conditions over various time durations. Although most examples in this disclosure reflect a per hour basis, it should be not that the exact time interval is not critical to the process and may be lengthened or shortened as needed. The controller 124 integrates the amount of electrical current provided to or drawn from the battery 110 over time, as well as monitoring real-time current and voltage of the battery 110.

As described in further detail below, the controller 124 uses information gathered from the BMS 116 and the revenue-grade meters 106, 118 in conjunction with an energy forecast 114 to determine an optimal charging rate for the battery 110 based on predicted available energy input, measured energy output from the renewable energy source 104 and electrical current flowing through the battery 110. The energy forecast 114 may vary in accordance with the type of renewable energy source 104. For example, for solar photovoltaic cell panels, the energy forecast 114 may reflect a prediction of hourly (or less) irradiance levels in the vicinity or geographic region where the solar panels are located. For a wind turbine, the energy forecast 114 may include a local weather forecast with hourly (or shorter) predictions for wind velocity. In addition, the energy forecast 114 may include predictions made on an historical basis, such as a monthly or daily historical report.

Figure 2:
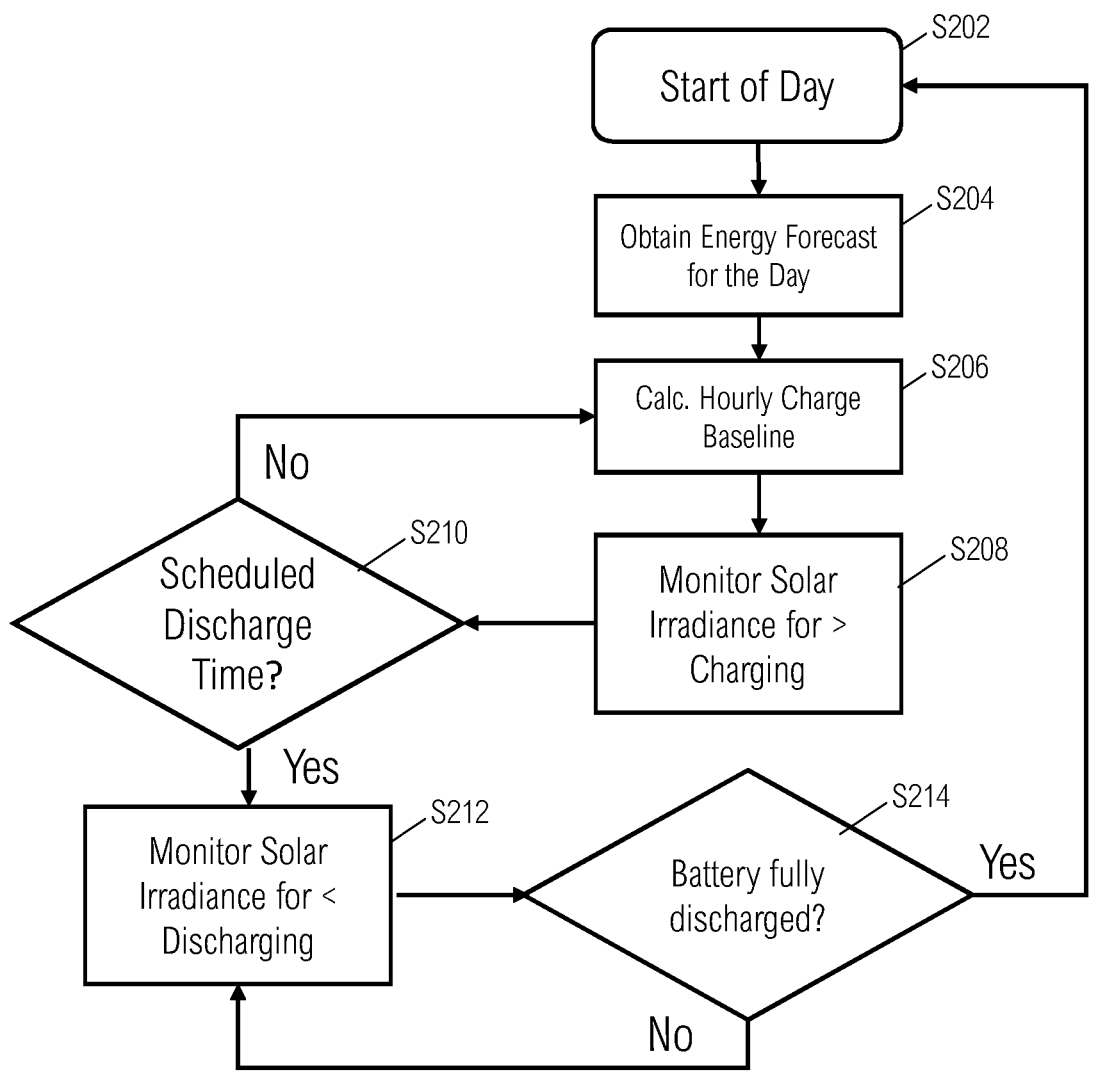
FIG. 2 is an operational flow diagram illustrating one process of charging a backup battery in a renewable energy producing system in accordance with one example of the present disclosure.

Referring now to FIG. 2, an operational flow diagram 200 is provided which illustrates one example method in accordance with the present disclosure. For simplicity's sake, the renewable energy source discussed in the example below is a solar panel; however, the principles of the present invention may be used with any renewable energy source. The process begins, at step S202, at the start of the workday when the energy forecast for the day is obtained, at step S204. The energy forecast 114 may be an hourly prediction of source energy, such as irradiance levels for solar panels, based on historical or current data, as shown in FIG. 3.

Figure 3:
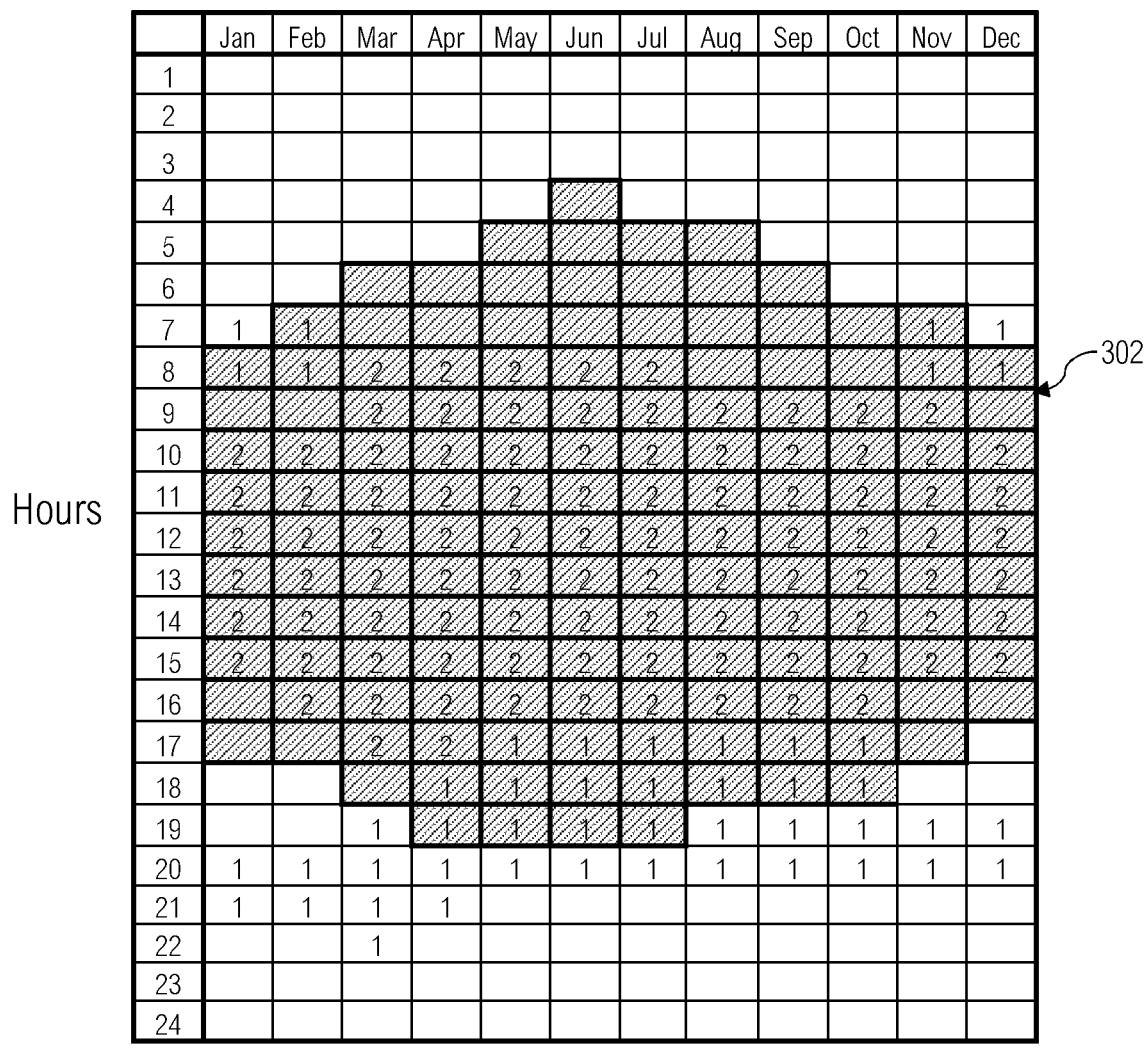
FIG. 3 is an example representation of a forecast predicting average energy input levels at a renewable energy producing system per hour, for one day, on a monthly basis.

In FIG. 3, the energy forecast 114 is an example irradiance forecast 300, by month, on an hourly basis. Although irradiance forecast 300 shows monthly historical hours, daily historical averages per hour or hourly predictions based on weather data may also be used. More granularity in the irradiance forecast 300 provides more accuracy in the energy obtained. Renewable sites are typically overbuilt in real power (MW) capability. This overbuilding allows the clipped energy to be captured. The potential clipped energy that can be captured by charging the battery is defined as Site MW capability—POI MW limit. The POI MW limit is the maximum amount of power that is allowed to be discharged to the grid 122. Irradiance forecast 300 shows historically "good" irradiance for the facility as the sun is out during the times indicated by the shaded area 302. In this context, during "good" irradiance periods, the energy output by the renewable energy source 104 is bordering on clipping. For example, for a renewable energy producing system 100 where the 100% state-of-charge is designed for a 40 MWh (Megawatt hour) capacity, "good" irradiance assumes there is a possibility of 4 MWh of clipping/hour. Hours shown with a numeral in the box (i.e. "1" or "2") indicate that there is a possibility of clipping the energy provided from the solar panels at this time (e.g., the higher number provides higher irradiance). The '1' typically corresponds with the peak demand time where the batteries are expected to discharge. The '1' in the shaded are signifies that there is ample irradiance for the renewable energy source 104 (i.e. solar panels connected to DC-to-AC inverter in this instance) to provide more of the MW limit at the shared POI 112 and the controller 124 reduces the battery discharge. During non-shaded hours, the battery 110 may be scheduled to discharge power to the power grid 122.

Returning to FIG. 2, an hourly charge baseline is predicted, at step S206, based on the energy forecast 114 and a remaining full charge deficit. The base MW charge setpoint per time interval (e.g., per hour) for charging the battery can be calculated as:

$$\text{MW Charge rate }[i]\text{=(Full MWh charge-MWh already charged) Remaining Charge Time} \quad [1]$$

Figure 4:
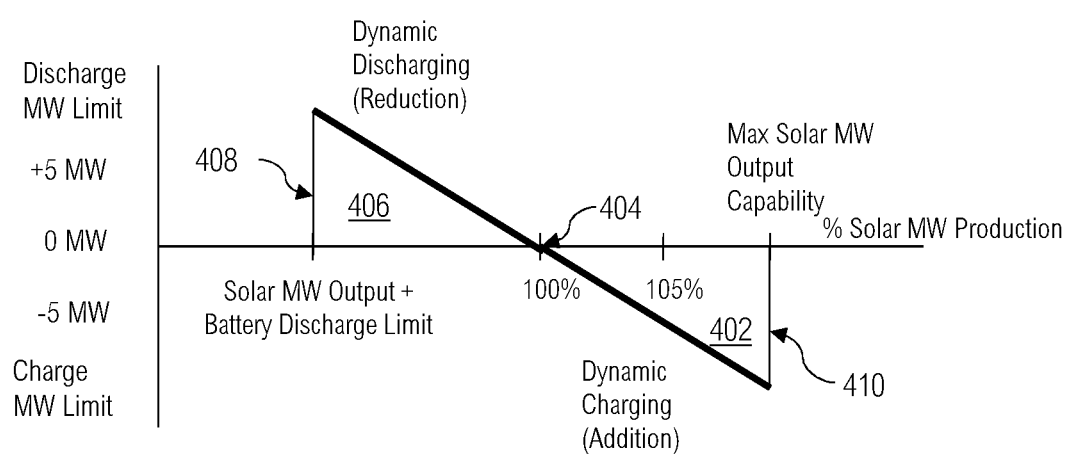
FIG. 4 is a graphical representation of a charging profile of a rechargeable battery in a renewable energy producing system based on charging limitations and battery conditions in accordance with an embodiment of the present disclosure.

More solar production may be recovered during the times that the solar panels are receiving such an abundance of irradiation that the solar inverters (i.e. solar panel (DC) to grid (AC)) would normally reach a point of self-clipping if the battery 110 was being statically charged or aggressively charged to avoid going over the POI MW limit. The graph of FIG. 4 shows a linear relationship between the rate of charging/discharging the battery and the amount of power available to the renewable energy sources 104 for supplying the power grid 122. The solar side (i.e. energy provided from the renewable energy source 104) will always try to produce up to the POI MW limit 404. In other words, during the positive portion 406 of the graph, from the minimum point 408 where the amount of energy available is at the lowest level in which the system can operate (i.e. the solar MW output+battery discharge limit) to the point where energy available to the solar panels is at the POI MW limit (i.e. 100%), the battery 110 is being dynamically discharged. During the negative portion 402 of the graph, from the POI MW limit 404 to the maximum solar MW output capability 410, (i.e. supply to solar panel is 100% and higher) the entire energy for the power grid is supplied from the solar panels and the battery 110 is being dynamically charged. When the amount of energy available from the solar panels exceeds the demand, charging for the battery 110 may be increased from the base charging setpoint until the energy from the solar panels is below the self-clipping MW limit at the point of interconnection. Without this dynamic charging/discharging portion, if there is ample solar irradiance and the batteries are not being charged hard enough or are discharging at full power, the solar source 104 will self-clip to POT MW limit. As an example, if the POI MW limit for a renewable energy source system 100 is 50 MW, since the system is generally overbuilt by 10%, the actual maximum solar MW output capability is 55 MW. So, when the available energy is between 50 and 55 MW, the energy that would normally be clipped is diverted to charge the battery 110.

Returning again to FIG. 2, the controller 124 continually monitors actual solar irradiance levels, at step S208, to allow for greater charging of the battery 110. The controller 124 calculates the solar site MW capability from the irradiance sensors, aggregates the solar inverters MW output, compares the output to the POI MW, and proactively increases the charging or decreases the discharging setpoint to the BESS 102 to allow for the solar production to be at its highest MW capability. If the base hourly charge setpoint calculated from the forecasted irradiance data is greater than the setpoint measured from actual real-time irradiance data, the charging rate is dynamically adjusted to the real-time charge setpoint. Since charging the battery is a negative setpoint, the lesser, more negative value is used. The real-time charge setpoint will keep increasing to prevent the solar site from exceeding contractual MW limits and is stored in the battery 110 to maximize the capture of what would have previously been clipped, wasted free energy.

As long as the battery 110 is not scheduled for discharge, at step S210, the controller 124 continues to monitor and adjust the real-time setpoint as needed, at steps S206 and S208. However, when the battery 110 is scheduled for discharge, at step S210, the controller 124 monitors the solar irradiance for possible reduction of discharging, at step S212. As shown by the graph of FIG. 4, when the battery is supposed to discharge to the power grid (i.e. the amount of total power supplied by the solar panels is less than 100%), there is a linear relationship in the amount of power supplied by the battery versus how hard the battery is being charged/discharged. Between the point of interconnection MW limit for the solar panels (i.e. point 404) where the entire amount needed by the power grid is supplied entirely by the solar panels and the battery is supplying its maximum amount (i.e. positive portion 406 of graph), the amount of solar production may be increased by discharging the battery 110 less than would have been discharged previously and possibly even charging the battery 110.

When the base hourly scheduled discharge setpoint calculated from the irradiance forecast 114 is greater than the current setpoint, the charging rate is dynamically adjusted to the real-time discharge setpoint. Discharge is a positive setpoint, so the lesser value is used to ensure that the required contractual power output is met without needlessly going over the limit as measured at the point of interconnection 112. The discharge setpoint will continue to decrease to allow the solar site to produce as many MWs as possible to satisfy the point of interconnection MW limit. It has been observed that there have been instances where the irradiance levels are so high, and the solar site still produces at maximum capacity, so the battery discharge setpoint actually transitions into a charge setpoint.

The battery 110 continues to discharge, at step S212, until it is fully discharged. When the battery 110 is fully discharged, at step S214, the process returns to the start to begin a new day. Any excess power stored in the battery 110 above the amount required by the point of interconnection MW limit may be sold back to the power grid and/or third parties and discharged back at the start of the new day.

Figure 5:
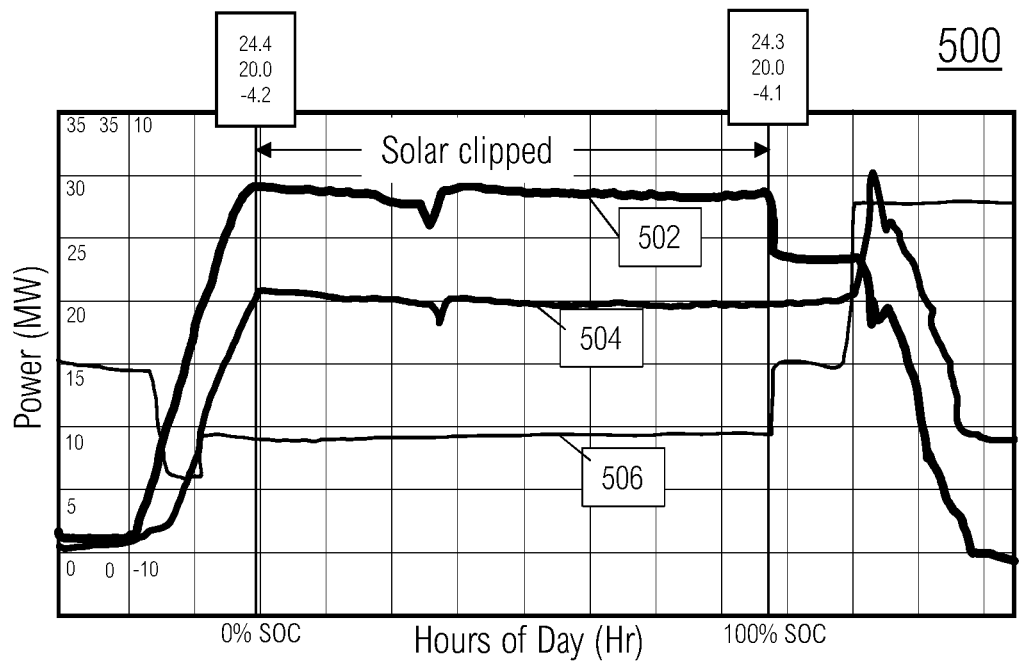
FIG. 5 is a graphical representation of a daily duty profile of a rechargeable battery in a prior art renewable energy producing system using a gradual static recharge.

Turning now to FIG. 5, a graph 500 is provided which illustrates gradually charging a 40 MWh capacity battery in a solar site in a gradual static manner, according to a prior art method. Line 502 represents the power being supplied by the solar panels. Line 504 represents the power measured at the point of interconnection 112. Line 506 represents the power being charged to or discharged from the battery 110.

In this example, a static, gradual charging rate of −4.2 MW requires about 9.5 hours to fully charge the battery 110 to a 40 MWh capacity (i.e. 4.2 MW×9.5 hrs=39.9 MWh). The flat portion of line 502 illustrates a period of time where the solar source self-clips. As the solar self-clipping occurs at 24.4 MW, 2 MW of excess power are wasted when this happens, resulting in a maximum of about 19 MWh clipped daily.

Figure 6:
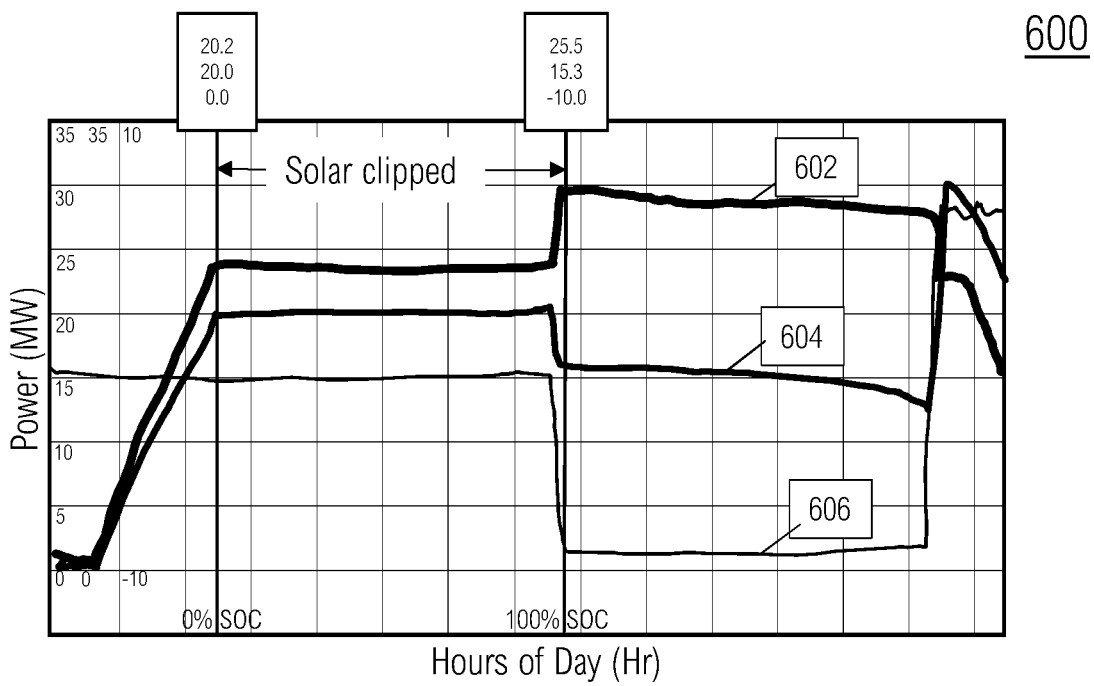
FIG. 6 is a graphical representation of a daily duty profile of a rechargeable battery in a prior art renewable energy producing system using an aggressive static recharge.

In FIG. 6, a graph 600 is provided which illustrates aggressively charging the 40 MWh capacity battery in a solar site in a more aggressive, static manner, according to another prior art method. Line 602 represents the power being supplied by the solar panels. Line 604 represents the power measured at the point of interconnection 112. Line 606 represents the power being charged to or discharged from the battery 110. In this example, a static, charging rate of −10.0 MW requires about 4 hours to fully charge the battery 110 to a 40 MWh capacity. The first flat portion of line 602 illustrates a period of time where the solar source self-clips. The solar self-clipping occurs at 20.2 MW, losing out on 6.2 MW of excess power when this happens, resulting in a maximum of about 34.1 MWh clipped daily.

Figure 7:
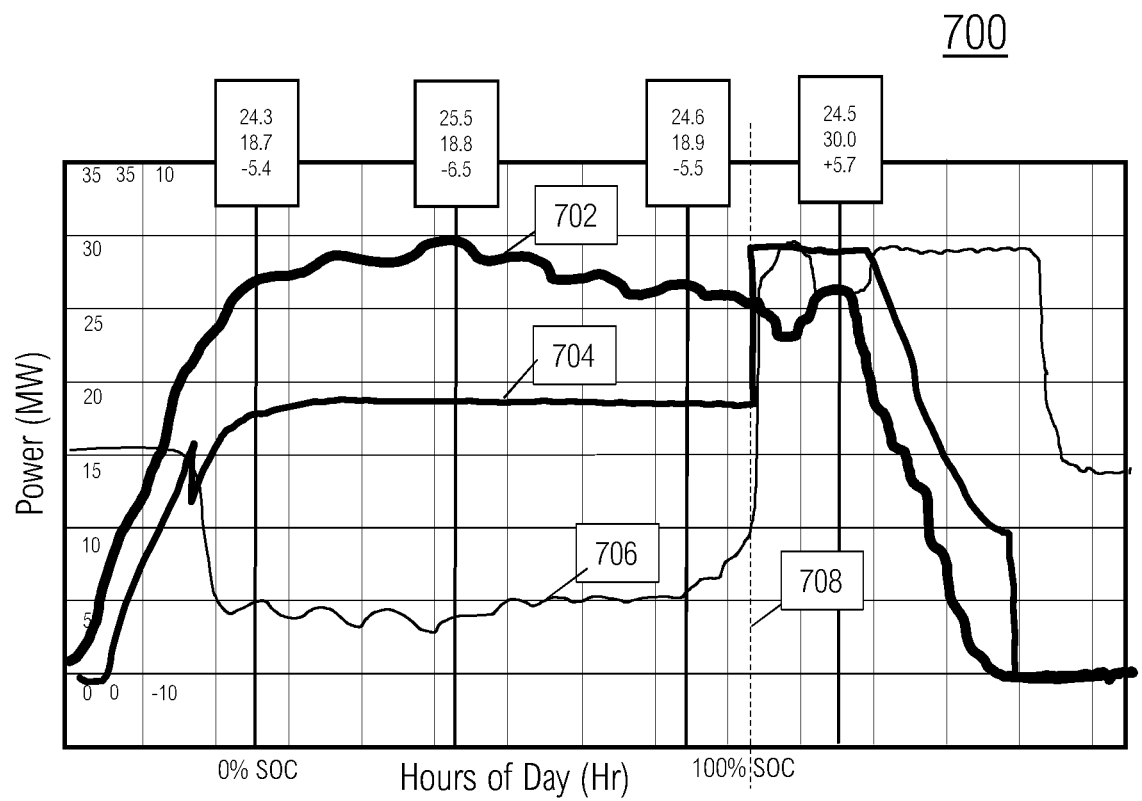
FIG. 7 is a graphical representation of a daily duty profile of a rechargeable battery in a renewable energy producing system using a dynamic recharge algorithm, according to one embodiment of the present disclosure.

FIG. 7 provides a graph 700 illustrating dynamically charging the 40 MWh battery in a solar site in accordance with an embodiment of the present method. Line 702 represents the power being supplied by the solar panels. Line 704 represents the power measured at the point of interconnection 112. Line 706 represents the power being charged to or discharged from the battery 110. It should be noted that the power to or from the battery (i.e. line 706) is generally an inversion of the power supplied by the solar panels (i.e. line 702). Dynamic charging takes the entire day to fully charge the battery at a gradual rate to allow for more solar production and enough time throughout the day to capture solar energy. The battery charging rate increases during higher irradiance times to allow the solar MWs to increase, thus there is never any self-clipping. In other words, there are no flat portions in the solar panel power line 702 because of the adjustments made to the battery charging line 706. It should also be noted that during the discharge portion, the algorithm works in the other direction and dynamically discharges the battery. If there is ample solar capability, the preset battery full power discharge will decrease to once again prevent solar from clipping itself while the grid sees the same amount of MWs, regardless of the source. This works two-fold in that the remaining energy after the discharge period is carried over to the next day, so there will be less need for charging from solar, thus increasing the renewable+storage's round-trip efficiency. (Round-trip efficiency is the minimal, but noticeable, power electronic losses when charging from renewables (DC to AC to DC) to discharging to the grid (DC to AC)).

Figure 8:
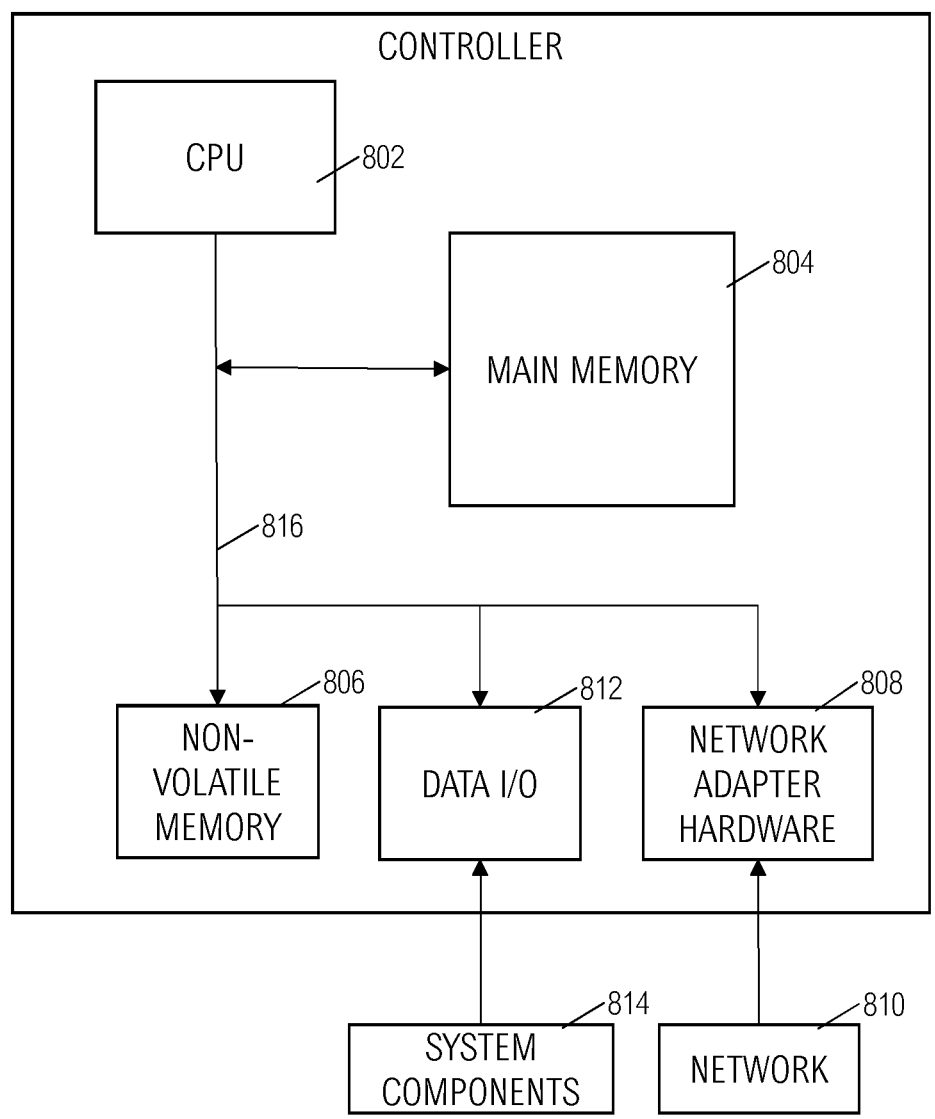
FIG. 8 is a block diagram of an example controller for use with the renewable energy producing systems, such as the one of FIG. 1, according to one embodiment of the present disclosure.

Turning now to FIG. 8, a block diagram illustrating a controller, such as controller 124 from FIG. 1, is provided in accordance with one example of the present disclosure. The controller 124 is an example of a processing subsystem that is able to perform any of the above described processing operations, control operations, other operations, or combinations of these.

The controller 124 in this example includes a central processing unit (CPU) 802 that is communicatively connected to a main memory 804 (e.g., volatile memory) and a non-volatile memory 806 to support processing operations. The CPU 802 is further communicatively coupled to a network adapter hardware 808 to support input and output communications with external computing systems such as through the illustrated network 810.

The controller 124 further includes a data input/output (I/O) processor 812 that is able to be adapted to communicate with any type of equipment, such as the illustrated system components 814. The data input/output (I/O) processor 812, in various examples, is able to be configured to support any type of data communications connections including present day analog and/or digital techniques or via a future communications mechanism. A system bus 816 interconnects these system components.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of charging a battery for a renewable energy source comprising:
   receiving a forecast having a plurality of predetermined time intervals with a predicted energy input level of the renewable energy source that is available to charge the battery corresponding to each predetermined time interval;
   calculating a setpoint for each predetermined time interval for an amount of power available to charge the battery for each predetermined time interval based on the corresponding predicted energy input level of the forecast that is available to charge the battery and a remaining full charge deficit;
   charging the battery during a predetermined time interval according to its corresponding setpoint;
   measuring an actual energy input level of the renewable energy source that is available to charge the battery during each predetermined time interval;
   comparing the actual energy input level to the setpoint for its corresponding time interval to determine which of the actual energy input level and the setpoint is a lesser energy input level; and
   setting the lesser energy input level as the setpoint for a remainder of the corresponding predetermined time interval.

2. The method of claim 1, wherein the renewable energy source comprises at least one solar photovoltaic cell panel.

3. The method of claim 2, wherein the forecast is an irradiance forecast.

4. The method of claim 1, wherein the renewable energy source comprises at least one wind turbine.

5. The method of claim 4, wherein the forecast predicts wind speed.

6. The method of claim 1, wherein the forecast is based on historical data.

7. The method of claim 1, wherein the predetermined time interval is one hour.

8. The method of claim 1, further comprising:
determining that the corresponding predetermined time interval is a scheduled battery discharge time interval; and
discharging the battery to an electric power distribution grid according to the setpoint for the remainder of the corresponding predetermined time interval.

9. The method of claim 1, further comprising discharging excess power from the battery for use by an outside party.

10. A renewable energy producing system comprising:
a rechargeable battery;
a load;
a transformer that exchanges energy between the rechargeable battery and the load; and
a controller that:
receives a forecast having a plurality of predetermined time intervals with a predicted energy input level of the renewable energy source that is available to charge the battery corresponding to each predetermined time interval;
calculates a setpoint for each predetermined time interval for an amount of power available to charge the battery for each predetermined time interval based on the corresponding predicted energy input level of the forecast that is available to charge the battery and a remaining full charge deficit; and
charges the battery during a predetermined time interval according to its corresponding setpoint; and
a battery management system that:
measures an actual energy input level of the renewable energy source that is available to charge the battery during each predetermined time interval;
compares the actual energy input level to the setpoint for its corresponding time interval to determine which of the actual energy input level and the setpoint is a lesser energy input level; and
sets the lesser energy input level as the setpoint for a remainder of the corresponding predetermined time interval.

11. The renewable energy producing system of claim 10, wherein the renewable energy source comprises at least one solar photovoltaic cell panel.

12. The renewable energy producing system of claim 10, wherein the forecast is an irradiance forecast.

13. The renewable energy producing system of claim 10, wherein the renewable energy source comprises at least one wind turbine.

14. The renewable energy producing system of claim 13, wherein the forecast predicts wind speed.

15. The renewable energy producing system of claim 10, wherein the controller further:
determines that the corresponding predetermined time interval is a scheduled battery discharge time interval; and
discharges the battery to an electric power distribution grid according to the setpoint for the remainder of the corresponding predetermined time interval.

16. The renewable energy producing system of claim 10, wherein the controller further: discharges excess power from the battery for use by an outside party.

17. A computer program product for charging a battery for a renewable energy source, the computer program product comprising:
a non-transitory storage medium readable by a processing circuit and storing instructions for execution by the processing circuit for performing a method comprising:
receiving a forecast having a plurality of predetermined time intervals with a predicted energy input level of the renewable energy source that is available to charge the battery corresponding to each predetermined time interval;
calculating a setpoint for each predetermined time interval for an amount of power available to charge the battery for each predetermined time interval based on the corresponding predicted energy input level of the forecast that is available to charge the battery and a remaining full charge deficit;
charging the battery during a predetermined time interval according to its corresponding setpoint;
measuring an actual energy input level of the renewable energy source that is available to charge the battery during each predetermined time interval;
comparing the actual energy input level to the setpoint for its corresponding time interval to determine which of the actual energy input level and the setpoint is a lesser energy input level; and
setting the lesser energy input level as the setpoint for a remainder of the corresponding predetermined time interval.

18. The computer program product of claim 17, wherein the renewable energy source comprises at least one of a solar photovoltaic cell panel or a wind turbine.

19. The computer program product of claim 17, wherein the forecast is at least one of an irradiance forecast or a weather forecast.

20. The computer program product of claim 17, further comprising instructions for:
determining that the corresponding predetermined time interval is a scheduled battery discharge time interval; and
discharging the battery to an electric power distribution grid according to the setpoint for the remainder of the corresponding predetermined time interval.

* * * * *